(12) United States Patent
Yun et al.

(10) Patent No.: US 9,661,394 B2
(45) Date of Patent: May 23, 2017

(54) APPARATUS AND METHOD FOR BROADCASTING SERVICES IN DIGITAL VIDEO BROADCASTING SYSTEM

(75) Inventors: Sung-Ryul Yun, Gyeonggi-do (KR); Ismael Gutierrez, Middlesex (GB); Hong-Sil Jeong, Seoul (KR)

(73) Assignee: Samsung Electronics Co., Ltd (KR)

( * ) Notice: Subject to any disclaimer, the term of this patent is extended or adjusted under 35 U.S.C. 154(b) by 757 days.

(21) Appl. No.: 12/986,655

(22) Filed: Jan. 7, 2011

(65) Prior Publication Data

US 2011/0167464 A1   Jul. 7, 2011

(30) Foreign Application Priority Data

Jan. 7, 2010 (KR) ........................ 10-2010-0001478

(51) Int. Cl.
| | |
|---|---|
| H04H 60/32 | (2008.01) |
| H04N 21/61 | (2011.01) |
| H04H 20/57 | (2008.01) |
| H04N 21/2381 | (2011.01) |
| H04N 21/414 | (2011.01) |
| H04N 21/438 | (2011.01) |
| H04N 21/643 | (2011.01) |
| H04H 20/72 | (2008.01) |
| H04H 60/73 | (2008.01) |

(52) U.S. Cl.
CPC ......... *H04N 21/6112* (2013.01); *H04H 20/57* (2013.01); *H04N 21/2381* (2013.01); *H04N 21/41407* (2013.01); *H04N 21/4381* (2013.01); *H04H 20/72* (2013.01); *H04H 60/73* (2013.01); *H04N 21/64315* (2013.01)

(58) Field of Classification Search
CPC .............................................. H04N 21/64315

USPC ................................................... 725/20, 136
See application file for complete search history.

(56) References Cited

U.S. PATENT DOCUMENTS

2005/0195852 A1   9/2005  Vayanos et al.
2006/0221885 A1*  10/2006  Nagaraj ........................ 370/328
(Continued)

FOREIGN PATENT DOCUMENTS

| KR | 1020060120271 | 11/2006 |
| WO | WO 2009/099272 | 8/2009 |
| WO | WO 2010/143861 | 12/2010 |

OTHER PUBLICATIONS

ETSI TR 102 831 V0.9.4: Digital Video Broadcasting (DVB); Implementation Guidelines for a Second Generation Digital Terrestrial Televsiion Broadcasting System (DVB-T2), Jan. 2009.*

(Continued)

*Primary Examiner* — Michael Hong
(74) *Attorney, Agent, or Firm* — The Farrell Law Firm, P.C.

(57) ABSTRACT

An apparatus and method for providing signaling information using inband transmission in a digital video broadcasting system where a frame for transmitting broadcasting data according to a ground-wave broadcasting service and broadcasting data according to a mobile broadcasting service is generated, and the generated frame is transmitted with an additional area for recording recognition information that indicates whether signaling information to be transmitted in the generated frame or the frame to be transmitted next time has been changed is allocated to a signaling information field of the generated frame.

18 Claims, 11 Drawing Sheets

(56) References Cited

U.S. PATENT DOCUMENTS

2009/0103649 A1* 4/2009 Vare et al. ............... 375/295
2009/0190677 A1* 7/2009 Jokela et al. ............. 375/260
2009/0213853 A1* 8/2009 Kwon et al. .............. 370/389
2010/0150054 A1* 6/2010 Becker et al. ............ 370/316

OTHER PUBLICATIONS

ETSI TR 102 377 V1.4.1: Digital Video Broadcasting (DVB); DVB-H Implementation Guidelines, Jun. 2009.*
ETSI TR 102 831 V0.9.4: Digital Video Broadcasting (DVB); Implementation Guideleines for a Second Generation Digital Terrestrial Television Broadcasting System (DVB-T2), Jan. 2009.*
ETSI EN 300 468 V1.6.1: Digital Video Broadcasting (DVB); Specification for Service Information (SI) in DVB Systems, Nov. 2004.*
Draft ETSI TR 102 831 V0.9.4: Digital Video Broadcasting (DVB); Implementation Guidelines for a Second Generation Digital Terrestrial.
Television Broadcasting System (DVB-T2), Jan. 2009.
Md. Samar Morshed, "Synchronization Performance in DVB-T2 System", Master of Science Thesis, Tampere University of Technology, Sep. 1, 2009, 84 pages.
Korean Office Action dated Mar. 16, 2017 issued in counterpart application No. 10-2011-0001999, 8 pages.

* cited by examiner

APPARATUS AND METHOD FOR BROADCASTING SERVICES IN DIGITAL VIDEO BROADCASTING SYSTEM

PRIORITY

This application claims priority under 35 U.S.C. §119(a) to an application entitled "Apparatus And Method For Broadcasting Services In Digital Video Broadcasting System" filed in the Korean Intellectual Property Office on Jan. 7, 2010 and assigned Serial No. 10-2010-0001478, the entire disclosure of which is incorporated herein by reference.

BACKGROUND OF THE INVENTION

1. Field of the Invention

The present invention relates generally to an apparatus and method for mobile broadcasting services in a digital video broadcasting system, and more particularly to an apparatus and method for providing signaling information using inband transmission in a digital video broadcasting system.

2. Description of the Related Art

Generally, a digital broadcasting system is a broadcasting system that uses a digital transmission technology providing services such as Digital Audio Broadcasting (DAB), Digital Video Broadcasting (DVB), Digital Multimedia Broadcasting (DMB), and the like.

The DVB system providing DVB service is a European digital broadcasting technology and transmission standard for supporting not only existing digital broadcasting but also digital multimedia service to a mobile or portable device.

The DVB system can multiplex broadcasting data based on MPEG 2 Transport Stream (TS), and simultaneously transmit data streams based on Internet Protocol (IP). Also, the DVB system can multiplex data streams according to diverse broadcasting services into one IP stream and transmit the IP stream where a user terminal demultiplexes the received IP stream into data streams according to individual services. The user terminal demodulates the data streams according to individual services, and outputs the demodulated data to a screen, thus, requiring information on what kind of diverse services are provided from the DVB system, what content the respective services include, and the like.

FIG. 1 illustrates a frame (T2 frame) structure of a physical layer in a general $2^{nd}$ generation terrestrial DVB broadcasting system ("DVB-T2 system").

The frame structure illustrated in FIG. 1 may be simply divided into a P1 and P2 symbol part ("preamble field") and a data symbol part ("data field"). In the preamble field, signaling information of frames is transmitted, and in the data filed, data, that is, payload, is transmitted.

First, the P1 preamble that is transmitted in the P1 symbol part of the preamble field is used to scan an initial signal of a frame in a receiver. Also, the P1 preamble is used to detect a frequency offset and to tune a center frequency in the receiver. Also, the P1 preamble is used to transmit identification information of a frame, a Fast Fourier Transform (FFT) size, and other transmission information to the receiver.

The P1 preamble is transmitted at the start of the frame, and is composed of a three-bit S1 field and a four-bit S2 field. The S1 field includes information on configurable elements (SISO, MISO, or mixed system) of the DVB-T2 system. Also, the S2 field includes information on the FFT size of the DVB-T2 system and a guard interval size.

Next, the P2 symbol part of the preamble field is used to transmit L1 signaling information. Here, the L1 signaling information includes information on DVB-T2 system parameters and data field configurable elements. Also, the P2 symbol part is composed of an L1-pre-signaling field and an L1-post-signaling field. The L1-pre-signaling field has a fixed length of 200 bits, and the L1-post-signaling field has a variable length.

In the L1-pre-signaling field, information as shown in Table 1 below is transmitted.

TABLE 1

| TYPE | 8 bits |
|---|---|
| BWT_EXT | 1 bit |
| S1 | 3 bits |
| S2 | 4 bits |
| L1_REPETITION_FRAG | 1 bit |
| GUARD_INTERVAL | 3 bits |
| PAPR | 4 bits |
| L1_MOD | 4 bits |
| L1_COD | 2 bits |
| L1_FEC_TYPE | 2 bits |
| L1_POST_SIZE | 18 bits |
| L1_POST_INFO_SIZE | 18 bits |
| PILOT_PATTERN | 4 bits |
| TX_ID_AVAILABILITY | 8 bits |
| CELL_ID | 16 bits |
| NETWORK_ID | 16 bits |
| T2_SYSTEM_ID | 16 bits |
| NUM_T2_FRAMES | 8 bits |
| NUM_DATA_SYMBOLS | 12 bits |
| REGEN_FLAG | 3 bits |
| L1_POST_EXTENSION | 1 bit |
| NUM_RF | 3 bits |
| CURRENT_RF_IDX | 3 bits |
| T2_VERSION | 4 bits |
| RESERVED | 6 bits |
| CRC_32 | 32 bits |

Information that is transmitted in the L1-pre-signaling field is described in detail in the DVB-T2 standard (ETSI EN 302 755).

Using L1_post_size (18 bits) information among the information transmitted in the L1-pre-signaling field, a start position of the data field can be calculated. The size of the L1-pre-signaling field is fixed to 200 bits. Accordingly, by adding the L1_post_size to the size of the L1-pre-signaling field, the start position of the data field can be known. That is, if the L1_post_size information is known, the start position of the data field that is positioned next to the L1-post-signaling field can be known.

The L1-post-signaling field includes a configurable field, a dynamic field, and an extension field. In addition, the L1-post-signaling field includes a Cyclic Redundancy Check (CRC) field for confirming existence/nonexistence of errors in the three fields, and a padding part that is filled with a parity part.

The size of the L1-post-signaling field can be confirmed by the L1_post_size of the L1-pre-signaling field. Accordingly, the receiver receives the L1-post-signaling field after receiving the L1-pre-signaling field.

Last, the data field can construct various services based on a Physical Layer Pipe (PLP) as mentioned in the DVB-T2 standard. Accordingly, the user terminal finds the PLP allocated to the user terminal itself from the PLP based data field that constitutes the services, and receives desired information.

Lately, with the increase of user demands for mobile broadcasting services, diverse broadcasting systems have been proposed. For example, Multimedia Broadcast and Multicast Services (MBMS) using mobile communication networks, Terrestrial-Digital Multimedia Broadcasting (T-DMB) for portable terminals, mediaFLO, DVB Handheld (DVB-H), and the like, have been proposed.

In addition, research for mobile broadcasting services using the DVB-T2 system has been made. However, because the DVB-T2 system is designed for terrestrial services, its performance deteriorates in a mobile environment.

Accordingly, in order to support the mobile services using the DVB-T2 system, the signaling and data robustness problems in the mobile environment need to be resolved. Specifically, P2 symbols that are used in the DVB-T2 system are transmitted for a short period through one (32K, 16K FFT), two (8K FFT), four (2K FFT), or 16 (1K FFT) OFDM symbols in accordance with the size of the FFT. Accordingly, in comparison to the data field that is transmitted through a relatively large number of symbols (255 OFDM symbols at maximum), such a data field is vulnerable in that it has relatively small time diversity.

SUMMARY OF THE INVENTION

Accordingly, the present invention has been made to solve the above-mentioned problems occurring in the prior art. The present invention provides an apparatus and method for improving the signaling robustness for mobile broadcasting services, terrestrial broadcasting services, or cable broadcasting services in a digital video broadcasting system.

In accordance with one aspect of the present invention, there is provided a method of providing broadcasting services based on inband transmission in a digital video broadcast transmission apparatus, which includes generating a frame for transmitting broadcasting data according to a terrestrial broadcasting service and broadcasting data according to a mobile broadcasting service; and transmitting the generated frame; wherein recognition information that indicates whether signaling information to be transmitted in the generated frame or the next frame of the generated frame has been changed is allocated to a signaling information field of the generated frame.

In accordance with another aspect of the present invention, there is provided a method of receiving broadcasting services provided based on inband transmission in a digital video broadcast reception apparatus, which includes receiving a frame according to the broadcasting services; and performing decoding of signaling information of the received frame, wherein recognition information indicating that the signaling information has been changed is recorded in a signaling information field.

In accordance with still another aspect of the present invention, there is provided a digital video broadcast transmission apparatus providing broadcasting services based on inband transmission, which includes a frame generation unit generating a frame for transmitting broadcasting data according to a terrestrial broadcasting service and broadcasting data according to a mobile broadcasting service; and a transmission unit transmitting the generated frame; wherein the frame generation unit records recognition information that indicates whether signaling information to be transmitted in the generated frame or the next frame of the generated frame has been changed in a signaling information field of the generated frame.

In accordance with still another aspect of the present invention, there is provided a digital video broadcast reception apparatus receiving broadcasting services provided based on inband transmission, which includes a reception unit receiving a frame according to the broadcasting services; and a frame analysis unit performing decoding of signaling information of the received; wherein the frame analysis unit checking recognition information indicating that the signaling information has been changed.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described with reference to the accompanying drawings. In the following description of the present invention, only parts required to understand the operation of the present invention will be described, and a detailed description of known functions and configurations incorporated herein will be omitted when it may make the subject matter of the present invention rather unclear.

Hereinafter, although an embodiment of the present invention is described using a mobile broadcasting service and a mobile receiver, it will be apparent that that the present invention can be applied to robust signaling transmission in diverse broadcasting services such as terrestrial broadcasting, cable broadcasting, and the like, or in a communication system.

In an embodiment of the present invention, a scheme for improving the robustness of signaling that should be first settled to provide a mobile broadcasting service based on a DVB-T2 system is laid out. Also, in order to provide a mobile broadcasting service in an inband system, the influence exerted on a DVB-T2 receiver is minimized.

Figure 1:
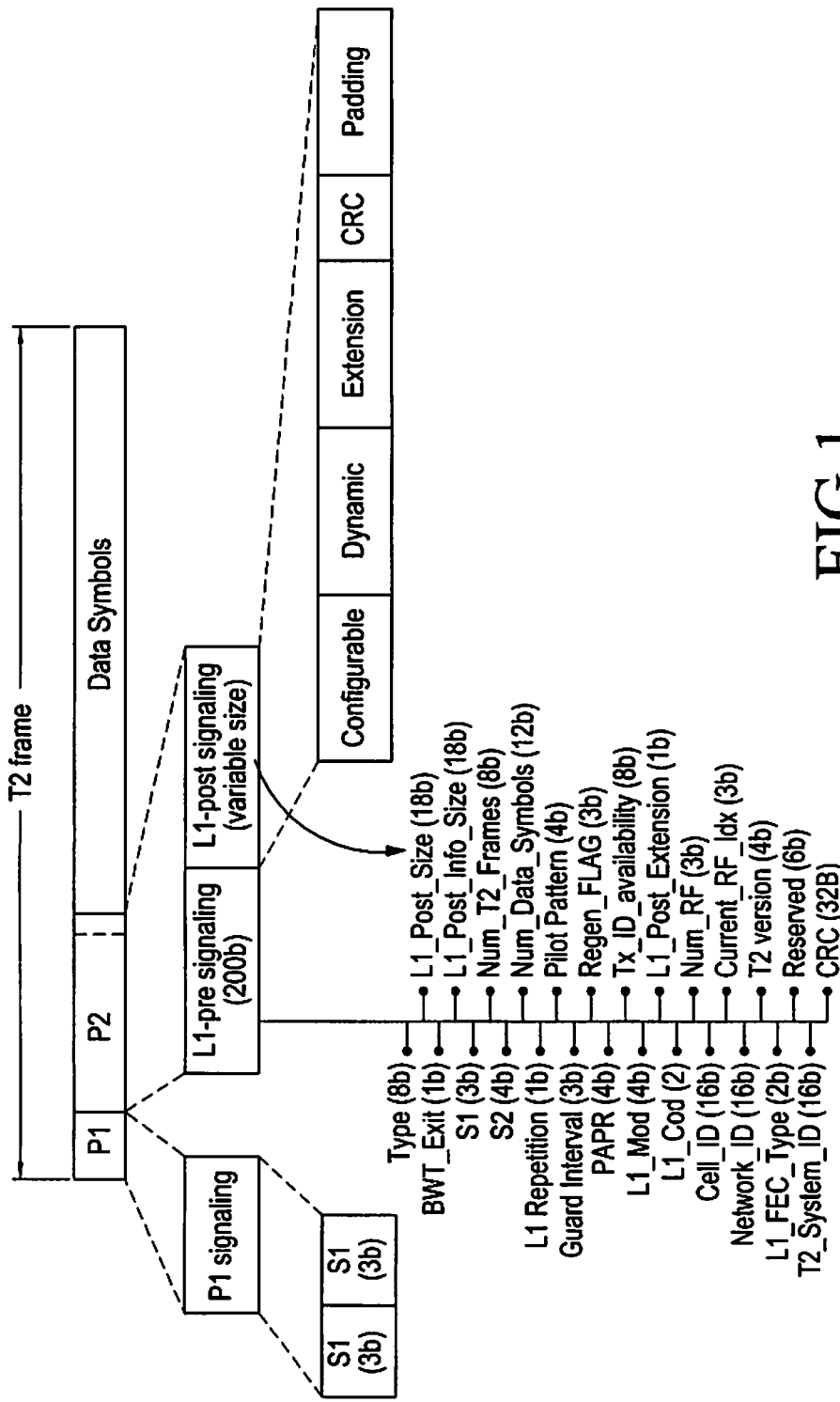
FIG. 1 is a diagram illustrating a frame structure of a physical layer in a general $2^{nd}$ generation terrestrial DVB broadcasting system.
Figure 2:
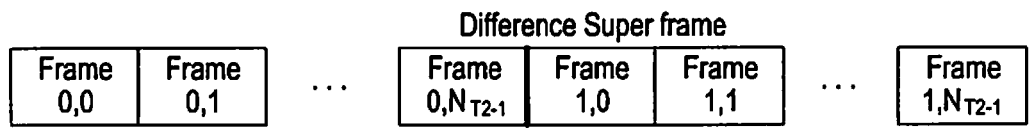
FIG. 2 is a diagram illustrating a transmission example of a superframe for supporting a mobile broadcasting service in a DVB-T2 system according to an embodiment of the present invention.

FIG. 2 is a diagram illustrating a transmission example of a superframe for supporting a mobile broadcasting service in a DVB-T2 system according to an embodiment of the present invention.

Referring to FIG. 2, a frame (n, m) denotes the m-th frame among a plurality of frames that constitute the n-th superframe. That is, in a frame (n, m), "n" denotes a superframe index, and "m" denotes a frame index that indicates a certain frame existing in the superframe. For example, a frame (0, 0) indicates the first frame having frame index '0' among frames that constitute the first superframe having superframe index '0'.

Accordingly, FIG. 2 illustrates an example in which the super frame is composed of $N_{T2}$ frames.

Figure 3:
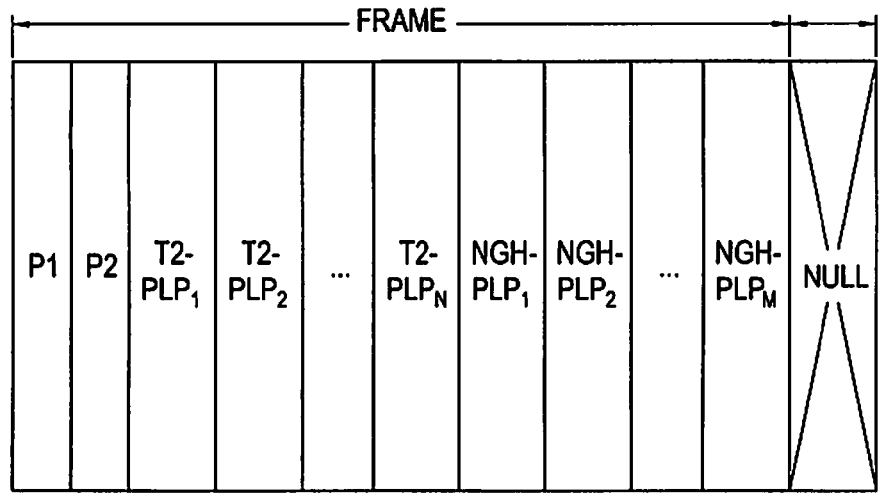
FIG. 3 is a diagram illustrating a frame structure of a superframe for a DVB-T2 system according to an embodiment of the present invention.

FIG. 3 is a diagram illustrating a frame structure of a superframe for a DVB-T2 system according to an embodiment of the present invention.

Referring to FIG. 3, a frame for supporting a mobile service using a DVB-T2 system that provides inband transmission is composed of a data field and a preamble field.

In the data field, a plurality of PLPs exists. Among the plurality of PLPs, some PLPs for mobile broadcasting exist. That is, in a part of the data field, a terrestrial T2-PLP is transmitted, and in the remaining part, a mobile Next Generation Handheld (NGH) PLP is transmitted.

Also, in the preamble field, a P1 symbol and a P2 symbol are transmitted.

The P2 symbol includes L1 signaling information. The L1 signaling information is used to discriminate T2_PLP and NGH-PLP from each other in the data field. Accordingly, the L1 signaling information should secure reliability even in a mobile environment.

However, since a P2 symbol is designed based on an environment of terrestrial broadcasting (such as a line of sight and the like), time diversity is insufficient in a mobile environment, and thus a problem may occur in reception performance. Accordingly, in order to solve this problem, a scheme for making a mobile receiver accurately receive the L1 signaling information is needed as it is particularly important to accurately receive L1-pre-signaling information among the L1 signaling information.

Figure 4:
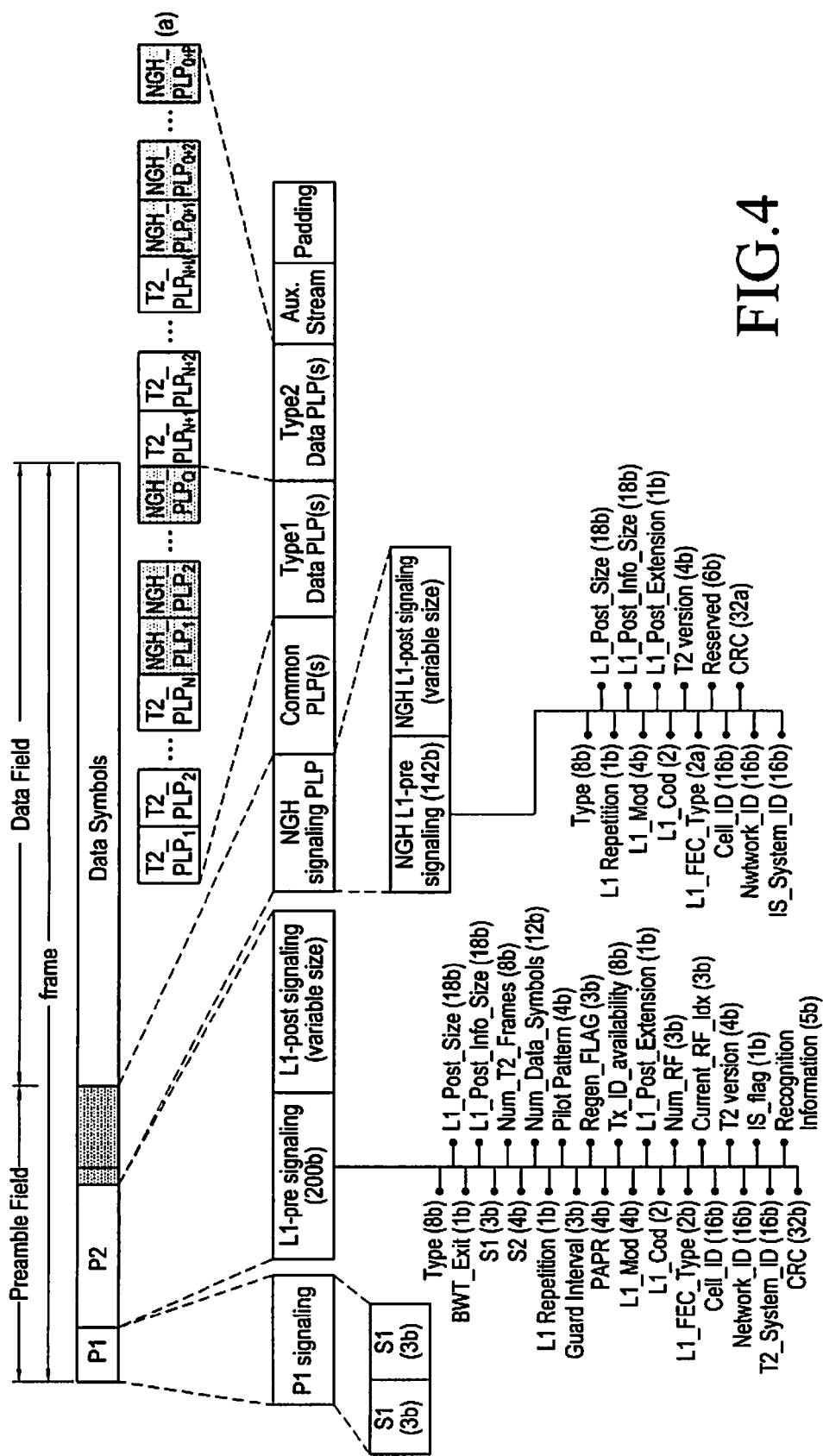
FIG. 4 is a diagram illustrating a detailed configuration of a frame for supporting a mobile broadcasting service based on inband transmission in a DVB-T2 system according to an embodiment of the present invention.

FIG. 4 is a diagram illustrating a detailed configuration of a frame for supporting a mobile broadcasting service based on inband transmission in a DVB-T2 system according to an embodiment of the present invention.

Referring to FIG. 4, a frame is composed of a preamble field and a data field. The preamble field is composed of a P1 symbol part, a P2 symbol part, and an NGH signaling part.

The P2 symbol part is divided into an area in which L1-pre-signaling information is transmitted ("L1-pre-singaling field") and an area in which L1-post-signaling information is transmitted ("L1-post-signaling field").

The L1-pre-signaling information includes L1_post_size information. The L1_post_size information indicates the size of a signaling field. The L1_post_size information should be accurately received by a mobile receiver. Accordingly, robustness is required for the L1-pre-signaling information.

In an embodiment of the present invention, a scheme for improving the robustness of the L2-pre-signaling information is presented.

In an embodiment of the present invention to be described below, the L1-pre-signaling information that is received for each frame is accumulated as a scheme for a mobile receiver to obtain accurate L1-pre-signaling information. Also, if necessary, a frame is decoded using the accumulated L1-pre-signaling information. By accumulating and using the L1-pre-signaling information as described above, the quality of the L1-pre-signaling information can be improved.

Accumulating the constant L1-pre-signaling information further improves the quality of the L1-pre-signaling information. Accordingly, if the mobile receiver can recognize the change of the L1-pre-signaling information, it is possible to accumulate only the constant L1-pre-signaling information.

Typically, in the DVB-T2 system, the L1-pre-signaling information may be constant in all frames that constitute the superframe. That is, in all frames that constitute one superframe, the constant L1-pre-signaling information may be transmitted. Occasionally, the L1-pre-signaling information in each frame in one superframe may be varied On the other hand, the change of the L1-pre-singaling information can be performed in a new superframe. However, the change of the L1-pre-signaling information is not necessarily performed in the unit of a superframe. That is, in the successive superframes, the L1-pre-signaling information transmitted in frames that constitute the previous superframe and the L1-pre-signaling information transmitted in frames that constitute the next superframe may be constant.

Accordingly, in an embodiment of the present invention, diverse schemes for a mobile receiver to recognize that the L1-pre-signaling information has been changed are laid out. For this, an additional field is added to the L1-pre-signaling field. For example, a reserved bit area (RESERVED: 6 bits) that exists in the L1-pre-signaling field that constitutes the existing T2 frame is used as an additional field. Also, in order to heighten the robustness of the L1-pre-signaling information, additional information is inserted into the additional field. The additional information may be recognition information that is helpful for the mobile receiver to recognize the change of the L1-pre-signaling information. That is, a scheme for the transmitter to transmit the recognition information through the additional field is laid out so that the receiver can recognize the change of the L1-pre-signaling information. As the recognition information, a change flag (L1_Pre_change_flag) or a specified sequence may be used.

In FIG. 4, an example in which one-bit IS_flag and 5-bit recognition information are added to the additional field is illustrated.

The IS_flag of one bit indicates whether inband transmission exists. For example, if the IS_flag is "0", it indicates that a PLP according to the inband transmission, that is, NGH-PLP, does not exist in the data field, while if the IS_flag is "1", the PLP according to the inband transmission, that is, NGH-PLP, exists in the data field. Accordingly, if the IS_flag is "1", an NGH signaling PLP part in which the signaling information that is required to receive the NGH-PLP is transmitted exists.

On the other hand, the 5-bit recognition information may include a change flag (L1_Pre_change_flag) or a specified sequence. As described above, the recognition information is used for the purpose of improving the robustness of the L1-pre-signaling information through accumulation of the L1-pre-signaling information.

Where the recognition information includes the change flag (L1_Pre_change_flag) or the specified sequence, a detailed operation of decoding the L1-pre-signaling information will be described later.

The NGH signaling PLP part is additionally provided for signaling of Inband System (IS), that is, NGH system. The size of the NGH signal PLP part is determined according to the amount of information to be transmitted. On the other hand, although FIG. 4 illustrates that the NGH signal PLP part exists in the preamble field of the frame for convenience in explanation, the NGH signal PLP part may be analyzed to be provided in the first PLP that constitutes the data field so that the structure of the existing T2 frame is not maximally changed.

The NGH signaling PLP part is divided into an area in which the NGH L1-pre-signaling information is transmitted ("NGH L1-pre-signaling field") and an area in which the NGH L1-post-signaling information is transmitted ("NGH L1-post-signaling field"). Here, the size of the NGH L1-pre-signaling field is fixed to 142 bits, and the size of the NGH L1-post-signaling field is variable.

In an embodiment of the present invention, a method of transmitting a secondary service (for example DVB-NGH) in a DVBG-T2 service signal using an inband method will be described. The secondary service signal is divided into a signal part (NGH signaling PLP) and a data part (NGH_PLP), and these two signals are transmitted in the data part of the DVB-T2 signal. However, as described above, the signal part (NGH signaling PLP) is included in the preamble field of the frame, and the data part (NGH_PLP) is included in the data field of the frame.

For example, the position of the NGH signaling PLP is fixed to the first PLP that is next to the P2 symbol in the frame or to the position that is next to the P2 symbol in the preamble field of the frame. The NGH signaling PLP is composed of information that indicates configurable elements of the NGH PLP and the like. The NGH signaling PLP may be freely designed at a predetermined position, and may be divided into an NGH L1-pre-signaling field and an NGH L1-post-signaling field in the similar manner to the signaling structure in the T2 system.

As described above, the reason why the NGH signaling PLP is separately transmitted is to accurately report the NGH_PLP by designing the NGH signaling PLP in consideration of a low coding rate, diversity addition, and the like.

Also, in order to decode the IS signaling information that is transmitted through the NGH signaling PLP, as described above, it is required to accurately receive information that is recorded in the L1_post_size field among the L1-pre-signaling information. Also, in order to prevent impact (or modification) from being given to the DVB-T2 receiver, it is required to report the information on whether the IS transmission exists through a reserved field that constitutes the L1-pre-signaling field. Accordingly, it is required to inform the receiver whether IS exists in the corresponding T2 frame through the IS_flag.

Also, in an embodiment of the present invention, a method of multiplexing NGH signaling and NGH data in a DVB-T2 signal will be described. In this case, the content included in the L1 signaling are similar to the DVB-T2 structure. That is, the structure of the NGH L1-pre-signaling field and IS L1-post-signaling field may be maintained.

As described above, the NGH signaling can be multiplexed in the first data PLP. Actually, in the T2 standard, it is known that a common PLP is positioned in the first PLP, and thereafter, a data PLP is received. However, transmission of the NGH signal in the first PLP exerts no influence on the receiver. This is because a configurable part of the L1-post-signaling field reports the position information of all PLPs.

Accordingly, through the NGH signaling, it becomes possible to use the NGH PLP in the frame. Also, the NGH signaling information may be appropriately designed according to the use of the inband system.

Next, transmission of the NGH PLP according to the support of the inband transmission will be described.

The above-described NGH PLP is allocated to the remaining part of the DVB-T2 data PLP (T2_PLP) to be transmitted. As illustrated in FIG. 4, the NGH PLP may be allocated to "Type 1" or "Type 2". Type 1 corresponds to a case where the PLP exists in one slice in the frame, and type 2 corresponds to a structure in which the PLP is divided into several slices in the frame to be transmitted.

On the other hand, as illustrated by option (a) in FIG. 4, the NGH PLP is positioned behind the T2_PLP, and may be successively transmitted. However, although not illustrated, the T2_PLP and the NGH_PLP may be alternately transmitted in a method that further heightens the time diversity.

In the current T2 standard, through configurable and dynamic L1-post-signaling field, the position information of the respective PLPs is signaled. Accordingly, the receiver may disregard a part of several PLPs or may receive only a desired PLP.

As a result, in spite of transmitting the position information of the NGH PLP as the L1 signaling information, it is required to separately transmit the NGH signaling information of the NGH PLP. This is because the L1-pre-signaling field and the L1-post-signaling field may not be accurately decoded in the receiver.

Hereinafter, a scheme for robustness of the L1-pre-singaling information using a change flag as recognition information according to an embodiment of the present invention will be described.

In an embodiment of the present invention, a change flag may be used as recognition information for identifying the change of L1-pre-signaling information. That is, in the frame that constitutes a superframe that is being transmitted, the change flag that indicates whether the L1-pre-signaling information has been changed is provided.

Accordingly, the receiver recognizes the change of the L1-pre-signaling information by the change flag that is included in the L1-pre-signaling information provided by frames. Accordingly, the receiver can accumulate only the constant L1-pre-signaling information based on the change of the L1-pre-signaling information. Also, if necessary, the frame can be decoded using the accumulated L1-pre-signaling information.

Table 2 below shows an example in which an additional field is designed when using the change flag in an embodiment of the present invention.

TABLE 2

| DVB-T2 L1-pre field (size in bits) | DVB-T2 L1-pre field with inband system (size in bits) | Meanings |
| --- | --- | --- |
| Reserved Bits (6) | IS_flag (1) | This bit is used to indicate the existence of an inband transmission. 1 - IS is transmitted within the current DVB-T2 frame. |

TABLE 2-continued

| DVB-T2 L1-pre field (size in bits) | DVB-T2 L1-pre field with inband system (size in bits) | Meanings |
|---|---|---|
| | IS_signaling_type (2) | Determines the position of the IS signaling. 00 - The IS signaling is located at the first PLP after the DVB-T2 L1-signaling. 01, 10, 11 - Reserved |
| | IS_L1_Code | It specifies the FEC scheme used for encoding the first part of the IS L1 signaling (IS_L1_pre). |
| | L1_Pre_change_flag (1) | It announces the change of the L1_Pre during the next frame. |

On the other hand, in an embodiment of the present invention, two methods may be considered as schemes for using the change flag, and can be summarized as in Table 3 below.

TABLE 3

| Method | L1_Pre_change_flag value | Requirement |
|---|---|---|
| 1 | 0 | Zeroth to $N_{T2-2}$-th frames |
| | 1 | Last frame ($N_{T2-1}$) |
| 2 | 0 | Superframe before change |
| | 1 | Superframe after change |

Method 1 in Table 3 transmits the change flag that indicates the change of the L1-pre-signaling information only in a specified frame among frames that constitute a super frame that is being currently transmitted where the change of the L1-pre-signaling information is expected in a superframe to be transmitted next time where the specified frames may be determined by engagement between a transmitter and a receiver in advance.

It is preferable to use the last frame among frames that constitute a superframe that is currently being transmitted as the specified frame. That is, in the remaining frames (zero to $N_{T2-2}$-th frames) that constitute the superframe that is currently being transmitted, a change flag (for example, "0") which indicates that the L1-pre-signaling information will not be changed, is transmitted, whereas, only in the last frame ($N_{T2-1}$-th frame), the change flag (for example, "1") which indicates that the L1-pre-signaling information will be changed is transmitted. Accordingly, if the change flag is changed from "0" to "1", the receiver recognizes that the L1-pre-signaling information will be changed in the next superframe.

Method 2 in Table 3 transmits the change flag, which has a value that is different from the value of the change flag that is transmitted from the frames that constitute the previously transmitted superframe, in the frames that constitute a superframe that will be newly transmitted. In this case, the change flags may be alternately used according to the number of changes.

As an example, if it is assumed that the L1-pre-signaling information is changed in each superframe, the change flag in the frames that constitute an even-numbered superframe is set to "0", and the change flag in the frames that constitute an odd-numbered superframe is set to "1".

Accordingly, if the change flag is changed from "0" to "1" or from "1" to "0", the receiver recognizes that the L1-pre-signaling information has been changed.

Figure 5:
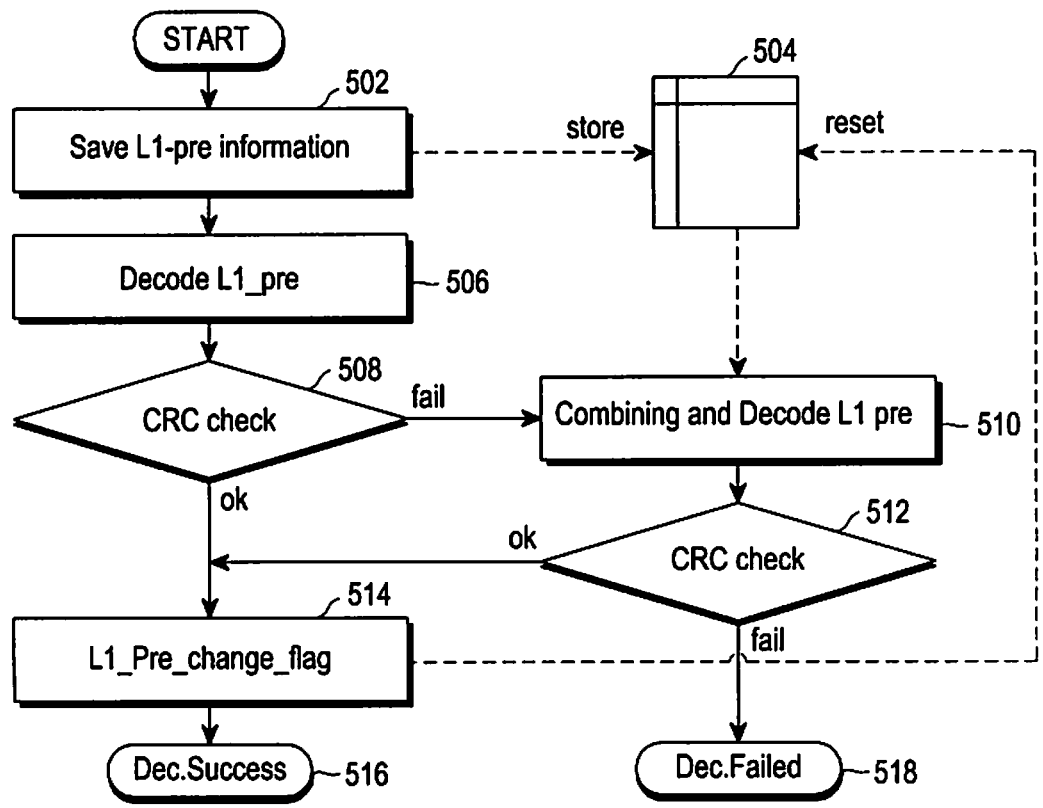
FIG. 5 is a diagram illustrating a control flow that is performed by a mobile receiver to decode L1-pre-signaling information when using a change flag according to an embodiment of the present invention.

FIG. 5 is a diagram illustrating a control flow that is performed by a mobile receiver to decode L1-pre-signaling information when using a change flag according to an embodiment of the present invention.

Referring to FIG. 5, the receiver receives the frame, and analyzes L1-pre-singaling information from the received frame. The L1-pre-signaling information is recorded in the L1-pre-signaling field that constitutes the P2 symbol part existing in the preamble field of the frame.

In Step 502, the receiver stores the L1-pre-signaling information analyzed from the received frame in a memory 504. The L1-pre-signaling information can be stored as a soft bit value or another value. The soft bit value is a Log Likelihood Ratio (LLR) value. In the following description, for convenience in explanation, it is assumed that the L1-pre-signaling information is stored as the soft bit value.

The soft bit value stored in the memory 504 is initialized when the requirement of the L1_pre_change_flag is satisfied. The initialization process is to avoid error propagation that occurs through combination of inaccurate soft bits or soft bits of other information in the receiver.

In Step 506, the receiver decodes the L1-pre-signaling information analyzed from the received frame. In Step 508, the receiver determines whether the decoding of the L1-pre-signaling information has been successfully performed using the CRC bit included in the L1-pre-signaling information.

If the decoding of the L1-pre-signaling information fails, the receiver combines the soft bit values stored in the memory 504 in Step 510. That is, the receiver combines the L1-pre-signaling information acquired through analysis of the previously received frame with the L1-pre-signaling information acquired through analysis of the currently receive frame, where the combining of the L1-pre-signaling information is performed by the soft bit values.

Also, the receiver re-performs the decoding of the L1-pre-signaling information acquired in Step 502 using the soft bit values acquired through the combining.

Thereafter, in Step 512, the receiver determines whether the decoding of the L1-pre-signaling information has been successfully performed using the CRC bit included in the L1-pre-signaling information.

As described above, if the decoding of the L1-pre-signaling information has been successfully performed, the receiver determines that the L1-pre-signaling information of the frame has been successfully received. Accordingly, the receiver obtains the position information of the NGH signaling PLP using the L1_post_size information included in the L1-pre signaling information. The acquisition of the position information of the NGH signaling PLP in the receiver is performed only when the receiver intends to receive the PLP according to the inband transmission. For this, the receiver refers to the IS-flag included in the L1-pre-signaling information. That is, only when the NGH PLP exists in the data field by the IS-flag, it is required to acquire the position information of the NGH signaling PLP.

At the same time, in Step 514, the receiver confirms the L1_Pre_change_flag that is the change flag included in the L1-pre-signaling information. Then, the receiver confirms whether the L1_Pre_change_flag satisfies the requirement.

Here, the requirement corresponds to the change of the L1_Pre_change_flag. That is, it is used as the requirement whether the L1_Pre_change_flag confirmed by the previously received frame and the L1_Pre_change_flag confirmed by the currently received frame have the constant value. Accordingly, if the L1_Pre_change_flag confirmed by the currently received frame has the value that is different from the value of the L1_Pre_change_flag confirmed by the previously received frame, the receiver recognizes that the L1-pre-signaling information is to be changed or has been changed.

For example, when using the method 1 as described above, the receiver recognizes that the L1-pre-signaling information to be included in the frame to be received next time will be changed when the L1_Pre_change_flag is changed. However, when using the method 1 as described above, the receiver recognizes that the L1-pre-signaling information included in the currently received frame, that is, the L1-pre-signaling information of which the decoding has been successfully performed, is different from the L1-pre-signaling information included in the previous frame.

Through the above-described operation, the receiver can recognize that the configuration of the received frame or the frame to be received has been changed. Also, the L1_Pre_change_flag has meaning to report the accumulation start time of the soft bit (LLR).

Accordingly, that the L1_Pre_change_flag satisfies the requirement corresponds to a case where the L1_Pre_change_flag has a value that corresponds to the change of the L1-pre-signaling information.

If the L1_Pre_change_flag satisfies the requirement, the receiver initializes the soft bit value accumulatively stored in the memory 504. Also, in Step 516, the receiver processes that the decoding of the previously received frame has been successful.

However, in Step 512, if an error is detected through the CRC check of the L1-pre-signaling information (if CRC fails), the receiver determines that the reception of the L1-pre-signaling information has failed. In this case, the receiver proceeds to Step 518, and processes that the decoding of the previously received frame has failed.

Then, the receiver repeatedly performs steps 502 to 518 to decode the frame to be received next time.

Hereinafter, a scheme for robustness of the L1-pre-singaling information using a sequence as recognition information according to an embodiment of the present invention will be described.

In an embodiment of the present invention, a sequence of a predetermined length (for example, 5 bits) may be used as recognition information for identifying the change of L1-pre-signaling information. That is, in the frame constituting a superframe that is being transmitted, the sequence that indicates whether the L1-pre-signaling information has been changed is provided.

Accordingly, the receiver recognizes the change of the L1-pre-signaling information by the correlation between the sequence included in the L1-pre-signaling information provided by frames and the sequence provided in the previously received frame. Accordingly, the receiver can accumulate only the constant L1-pre-signaling information based on the change of the L1-pre-signaling information. Also, if necessary, the frame can be decoded using the accumulated L1-pre-signaling information.

For example, using the degree of correlation of 5-bit sequence that exists in the additional field constituting the L1-pre-signaling field in a successively received frame and an Average Correlation Ratio (ACR), the change of the L1-pre-signaling information can be recognized. This enables the receiver to easily detect the L1-pre-signaling information.

Table 4 below shows an example in which an additional field is designed when using the sequence in an embodiment of the present invention.

TABLE 4

| DVB-T2 L1-pre field (size in bits) | DVB-T2 L1-pre field with inband system (size in bits) | Meaning |
| --- | --- | --- |
| Rsv (6) | IS_flag (1) | This bit is used to indicate the existence of an inband transmission. 1 - IS is transmitted within the current DVB-T2 frame. 0 - no IS is transmitted. |
|  | Sequence (5) | These bits are generated and thus the L1_pre cross-correlation between successive superframes is minimized. |

The method using Table 4 as described above calculates a cross correlation value between sequences acquired by two successive frames, and easily confirms the change of the L1-pre-signaling information based on the calculated cross correlation value.

If at least two successive frames have the constant L1-pre-signaling information, the cross correlation value calculated by the at least two successive frames will appear large. However, if the at least two successive frames have different L1-pre-signaling information, the cross correlation value calculated by the two frames will appear small.

As described above, the reason why the above-described cross correlation values appear is that the at least two successive frames have different sequences when the change of the L1-pre signaling information occurs between the at least two successive frames.

On the other hand, in order to determine whether the two successive frames have the constant L1-pre-signaling information or different L1-pre-signaling information by the calculated cross correlation value, a determination reference is required. That is, in order to determine whether the L1-pre-signaling information has been changed by the calculated cross correlation value, a predetermined threshold value is required.

For example, as the threshold value, an ACR value that is determined by the ratio of an upper cross correlation value to a lower cross correlation value may be used. Here, the upper cross correlation value is determined by an average of cross correlation values calculated by the constant sequence, and the lower cross correlation value is determined by an average of cross correlation values calculated by different sequences.

For example, if the calculated cross correlation value is equal to or larger than the threshold value, it is determined that the L1-pre-signaling information received by the two successive frames is constant. However, if the calculated cross correlation value is smaller than the threshold value, it is determined that the L1-pre-signaling information received by the two successive frames is different from each other. That is, the change of the L1-pre-signaling information can be confirmed from two successive frames.

Figure 6:
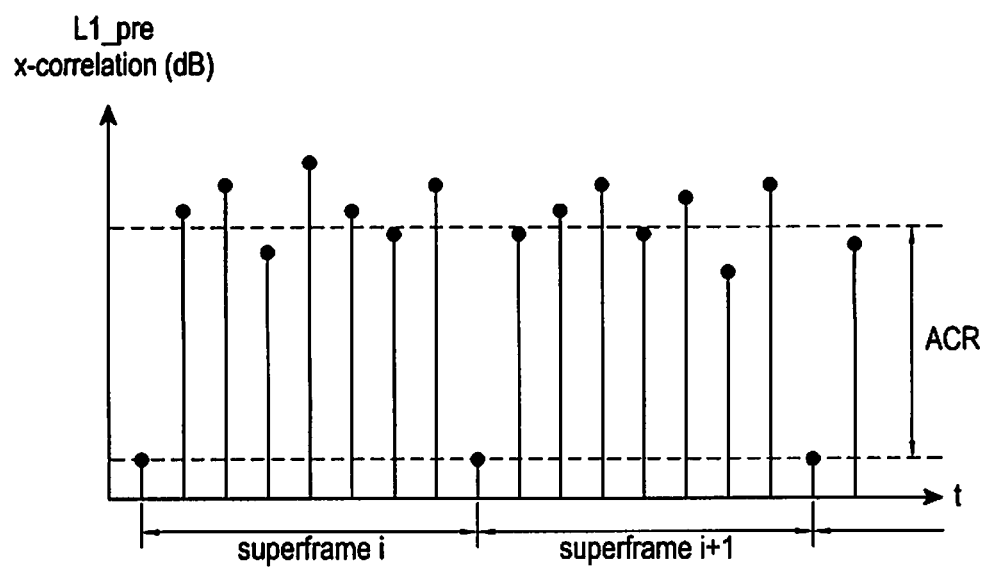
FIG. 6 is a diagram illustrating an example of recognizing the change of L1-pre-signaling information by the degree of correlation of L1-pre-signaling information when using a sequence according to an embodiment of the present invention.

FIG. 6 is a diagram illustrating an example of recognizing the change of L1-pre-signaling information by the degree of correlation of L1-pre-signaling information when using a sequence according to an embodiment of the present invention. That is, cross correlation values calculated corresponding to the respective frames that constitute a plurality of successive superframes and ACR are shown in FIG. 6.

As shown in FIG. 6, when different sequences are applied, the cross correlation values become considerably small, and thus the receiver can accurately recognize the change of the L1-pre-signaling information.

Table 5 below shows a configuration example of a binary sequence combination as sequences to be used as the recognition information.

TABLE 5

| Example | Sequence (5 bits) |
|---|---|
| Two | {1, 1, 1, 1, 1}, {−1, −1, −1, −1, −1} |
| Four | {−1, −1, −1, −1, −1}, {1, −1, 1, 1, −1}, {−1, 1, 1, −1, 1}, {1, 1, −1, 1, 1} |

According to Table 5, when expressing the sequences by a combination of two binary sequences, the cross correlation value that corresponds to the constant sequence is 5, and the cross correlation value that corresponds to the different sequences is −5. On the other hand, when expressing the sequences by a combination of four binary sequences, the cross correlation value that corresponds to the constant sequence is 5, and the cross correlation value of the different sequences is −1.

Based on the cross correlation values calculated as above, the ACR in the first example is 10, and the ACR in the second example is 6. Accordingly, when using a combination of two sequences, the performance that can discriminate two signals from each other becomes superior.

On the other hand, even when using two combinations of 32 sequences, in addition to the sequences exemplified as above, the same performance can be obtained.

Figure 7:
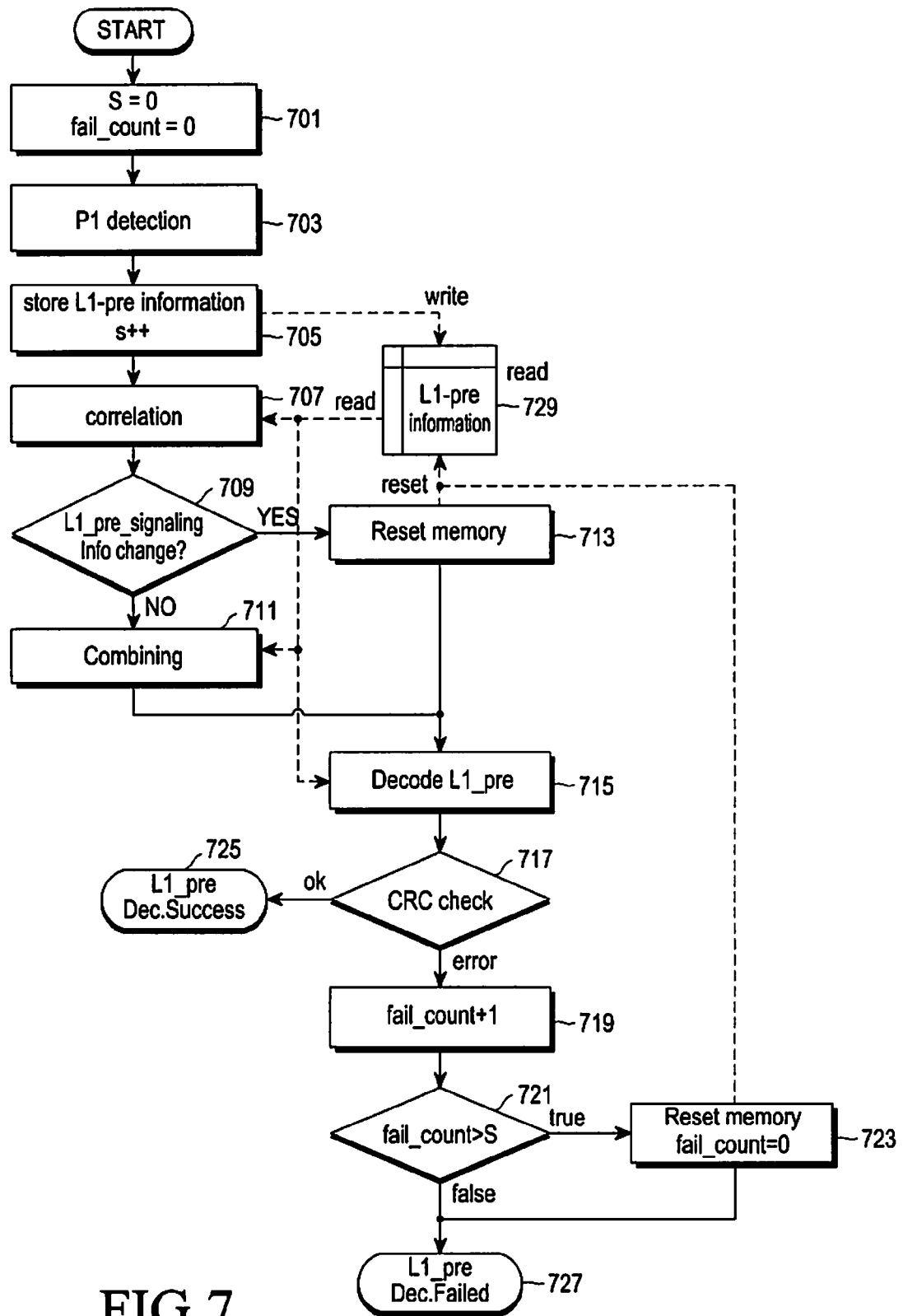
FIG. 7 is a diagram illustrating a control flow that is performed by a mobile receiver to decode L1-pre-signaling information when using a sequence according to an embodiment of the present invention.

FIG. 7 is a diagram illustrating a control flow that is performed by a mobile receiver to decode L1-pre-signaling information when using a sequence according to an embodiment of the present invention. In this case, the sequence may be dynamic sequence information.

Referring to FIG. 7, in starting the operation, the receiver performs initialization that corresponds to the first start of a frame. That is, in Step 701, the receiver sets the P2 symbol counter value s and a fail counter value fail_count to "0." The P2 symbol counter value s is a value for counting P2 symbols of which decoding has been performed, and the fail counter value fail_count is a value for counting the L1-pre-signaling information of which decoding has failed.

Thereafter, the terminal receives a frame, and detects information of the P1 symbol part of the received frame in Step 703. The receiver recognizes the configuration of a DVB-T2 system, FFT, protection period, and the like by detecting information of the p1 symbol part.

In Step 705, the receiver acquires the L1-pre-signaling information that exists in the P2 symbol part and stores the acquired information in a memory 729. Also, the receiver increases the P2 symbol counter value s by 1. The L1-pre-signaling information may be stored in the memory 729 as a soft bit value or another value. In the following description, explanation will be made using the soft bit value.

In Step 707, the receiver calculates a cross correlation value of the L1-pre-singaling information that is previously received and stored in the memory 729 based on the sequence included in the L1-pre-signaling information. Also, in Step 709, the receiver determines whether the L1-pre-signaling information has been changed by comparing the calculated cross correlation value with the ACR.

If the L1-pre-signaling information has not been changed, the receiver combines the soft bit value newly acquired and the soft bit values previously stored in the memory 729 in Step 711.

However, if the L1-pre-signaling information has been changed, the receiver clears the soft bit values stored in the memory 729 by resetting the memory 729 in Step 713.

In this case, the decoding and CRC checking of the L1-pre-signaling information received before the combining may be performed, and the combining may be performed only when the L1-pre-signaling information has not been normally decoded.

The receiver performs the combining or performs decoding of the L1-pre-scaling information in Step 715 after resetting the memory 729. In this case, in order to decode the L1-pre-signaling information, the receiver uses the combined soft bit value or the soft bit value newly stored in the memory 729. That is, by decoding the L1-pre-signaling information using the repeatedly accumulated soft bit value, the decoding performance can be improved.

The receiver performs the CRC checking of the result of decoding after performing the decoding of the L1-pre-signaling information. Then, in Step 717, the receiver determines whether the decoding of the L1-pre-signaling information has succeeded through the CRC checking of the result of decoding.

If the decoding has succeeded, the receiver processes the succeeding of decoding of the L1-pre-signaling information in Step 725. However, if the decoding has failed, the receiver increases the fail counter value fail_count by 1 in Step 719.

Also, in Step 721, the receiver compares the preset number S of accumulated frames with the fail counter value fail_count. If the fail counter value fail_count is equal to or smaller than the preset number S of accumulated frames, the receiver processes the failure of decoding of the L1-pre-signaling information in Step 727.

In this case, although the decoding of the L1-pre-signaling information has failed, the soft bit values stored in the memory 729 can be continually used to decode the L1-pre-signaling information. That is, although the decoding of the currently received L1-pre-signaling information has failed, the performance of decoding of the next L1-pre-signaling information to be performed in the future can be heightened.

By contrast, if the fail counter value fail_count is larger than the number of accumulated frames preset by the DVB-T2 system, the receiver determines that the channel environment is very inferior.

This is because the decoding of the L1-pre-signaling information has failed although the L1-pre-signaling information has been decoded by the soft bit value accumulated several times.

In this case, the receiver resets the memory 729 in Step 723 to perform the decoding of the L1-pre-signaling information by a newly accumulated soft bit value and resets the fail counter value fail_count to "0".

In Step 727, the receiver proceeds to process the failure of decoding of the L1-pre-signaling information after resetting the memory 729.

The performance of the method of decoding the L1-pre-signaling information as illustrated in FIG. 7 may differ according to the ratio of accumulated frames. In a very short superframe, that is, where the number of frames that constitute the superframe is small, the soft bit values may not be properly collected. In this case, a satisfactory decoding performance may not be obtained. Accordingly, it is required to obtain and set the optimum number of frames that correspond to the channel environment.

Figure 8:
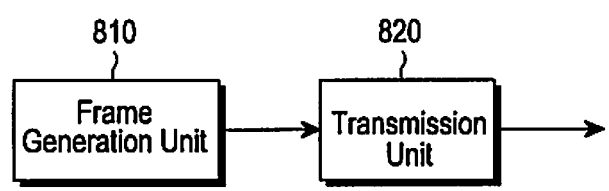
FIG. 8 is a diagram illustrating the configuration of a transmitter according to an embodiment of the present invention.

FIG. 8 is a diagram illustrating the configuration of a transmitter according to an embodiment of the present invention.

Referring to FIG. 8, a frame generation unit 810 generates a frame for supporting both terrestrial broadcasting and mobile broadcasting. A frame structure generated by the frame generation unit 810 is illustrated in FIG. 4.

A data field that constitutes a frame that is generated by the frame generation unit 810 includes broadcasting data T2_PLP for a terrestrial broadcasting service and broadcasting data NGH_PLP for a mobile broadcasting service. The preamble field of the frame generated by the frame generation unit 810 includes a P1 symbol area, a P2 symbol area, and an NGH signaling area. In the L1-pre-signaling field that constitutes the P2 symbol area, L1-pre-signaling information that is required to decode the broadcasting data T2_PLP and NGH_PLP is included. In particular, the L1-pre-signaling information includes recognition information that indicates whether the L1-pre-signaling information to be transmitted at the current frame or at the next frame has been changed.

The recognition information may be a change flag or a sequence. The change flag is one-bit information for identifying the change of the L1-pre-signaling information to be transmitted by the next frame or the change of the L12-pre-signaling information transmitted by the current frame. The sequence is 5-bit information that is changed according to the change of the L1-pre-signaling information to be transmitted by the frame.

The frame generation unit 810 generates a frame so that NGH signaling information for decoding NGH_PLP that is transmitted through the data field is included in an NGH signaling field.

The frame generated by the frame generation unit 810 is provided to a transmission unit 820. The transmission unit 820 transmits the frame generated by the frame generation unit 810 using allocated resources.

Figure 9:
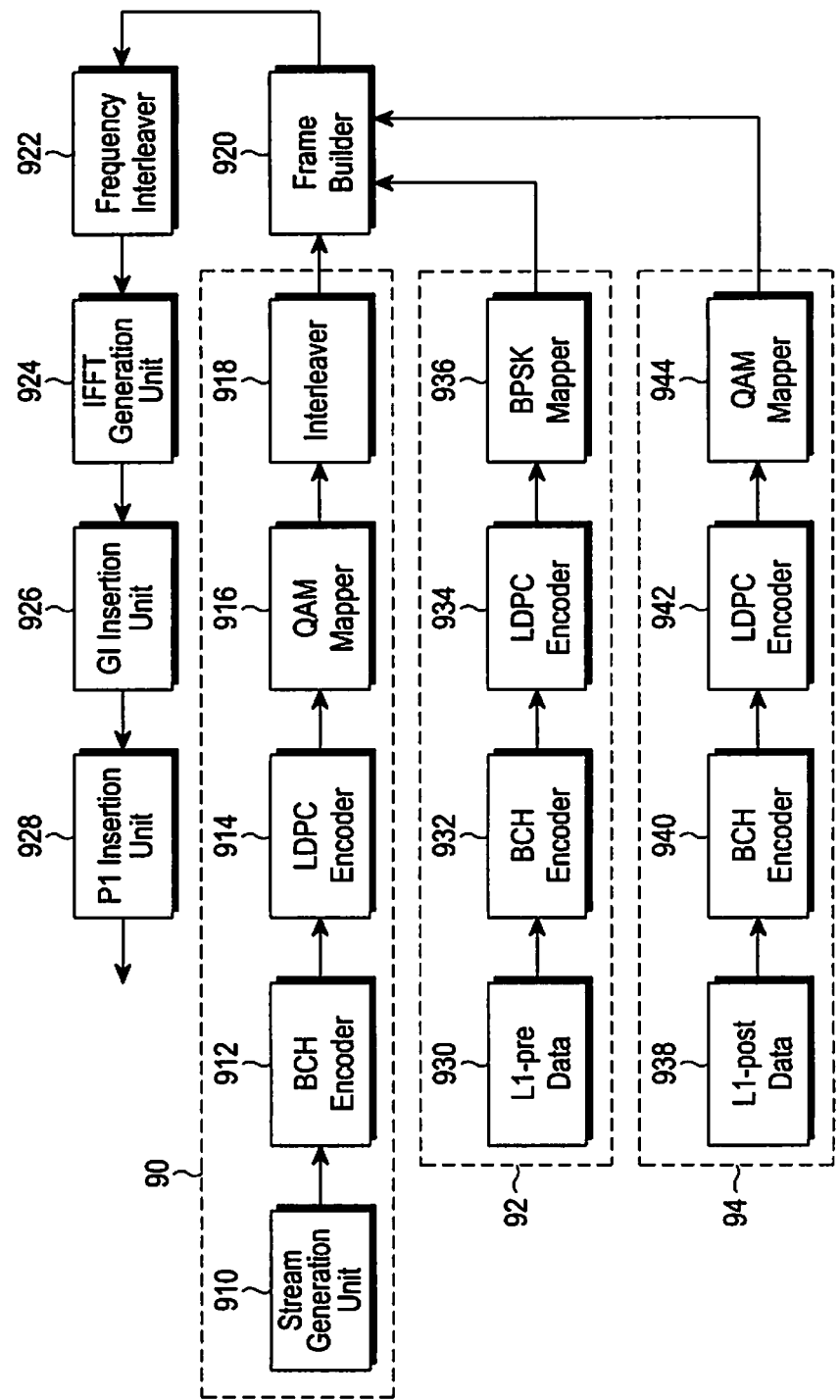
FIG. 9 is a diagram illustrating the detailed configuration of a frame generation unit in a transmitter according to an embodiment of the present invention.

FIG. 9 is a diagram illustrating the detailed configuration of a frame generation unit in a transmitter according to an embodiment of the present invention.

Referring to FIG. 9, a broadcasting data generation unit 90 generates broadcasting data to be transmitted through the data field that constitutes the frame. In this case, the broadcasting data includes broadcasting data T2_PLP for a terrestrial broadcasting service and broadcasting data NGH_PLP for a mobile broadcasting service.

The broadcasting data generation unit 90 includes a stream generation unit 910, a BCH encoder 912, an LDPC encoder 914, a Quadrature Amplitude Modulation (QAM) mapper 916, and an interleaver 918.

The stream generation unit 910 generates broadcasting data. The broadcasting data generated by the stream generation unit 910 is channel-coded through the BCH encoder 912 and the LDPC encoder 914. The channel-coded data is modulated by the QAM mapper 916. The signal modulated by the QAM mapper 916 is interleaved by cell and time through the interleaver 918. The interleaved data is transferred to the frame builder 920.

The L1-pre-signaling information generation unit 92 generates L1-pre-signaling information required to decode the broadcasting data. The L1-pre-signaling information includes IS_flag that indicates the existence/nonexistence of the broadcasting data NGH_PLP according to inband transmission and recognition information that indicates whether the L1-pre-signaling information has been changed. In this case, the recognition information may be a change flag or a sequence. That is, an additional bit for improving the performance of the L1-pre-signaling is inserted into the L1-pre-signaling information.

The L1-pre-signaling information generation unit 92 includes a BCH encoder 932, an LDPC encoder 934, and a Binary Phase Shift Keying (BPSK) mapper 936.

The L1-pre data 930 is channel-coded through the BCH encoder 932 and the LDPC encoder 934. The channel-coded signal is modulated by a BPSK method in the BPSK mapper 936. The BPSK-modulated L1-pre-signaling information is transmitted to the frame builder 920.

The L1-post-signaling information generation unit 94 generates L1-post-signaling information that is required to decode the broadcasting data. The L1-post-signaling information unit 94 includes a BCH encoder 940, an LDPC encoder 942, and a QAM mapper 944.

The L1-post data 938 is channel-coded through the BCH encoder 940 and the LDPC encoder 942 in the same manner as the L1-pre data. The channel-coded signal is modulated into a QAM signal through the QAM mapper 944. The QAM-modulated L1-post-signaling information is transferred to the frame builder 920.

The L1-pre-signaling information and the L1-post-signaling information that transmit control information of the transmitted signal are encoded in different channel coding methods.

As described above, T2_PLP and NGH_PLP generated by the broadcasting data generation unit 90, the L1-pre-signaling information generated by the L1-pre-signaling information generation unit 92, and the L1-post-signaling information generated by the L1-post-signaling information generation unit 94 are multiplexed by the frame builder 920.

The multiplexed frame signal is interleaved into a frequency domain through a frequency interleaver 922. The signal interleaved into the frequency domain is generated as a signal in a time domain by an Inverse Fast Fourier Transform (IFFT) 924. The time domain signal is transferred to the Guard Interval (GI) insertion unit 926 and a guard interval is inserted into the time domain signal to generate a final transmitted signal. A p1 symbol that is used to detect the DVB-T2 frame is inserted into a front end of the transmitted signal by the P1 insertion unit 928.

The DVB-T2 frame (a transmitted signal composed of the P1 symbol, the L1 signaling information, T2_PLP, the NGH signaling information, and NGH_PLP) configured as above is transmitted to the receiver through a channel. On the other hand, in FIG. 9, a configuration that adds the NGH signaling information to the frame is not disclosed. However, when adding the NGH signaling information to the first PLP of the data field that constitutes the frame, the stream that includes the NGH signaling information will be generated by the stream generation unit 910.

Otherwise, when adding the NGH signaling information to the preamble field of the frame, a configuration for coding and modulating the NGH signaling information may be separately provided.

Figure 10:
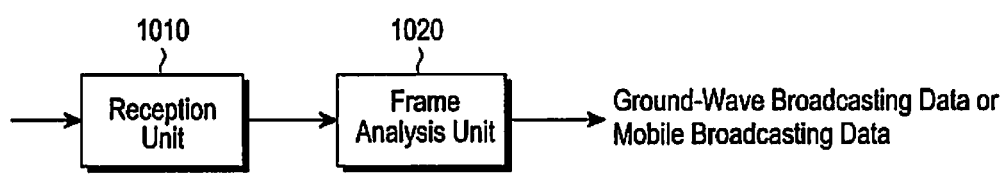
FIG. 10 is a diagram illustrating the configuration of a receiver according to an embodiment of the present invention.

FIG. 10 is a diagram illustrating the configuration of a receiver according to an embodiment of the present invention.

Referring to FIG. 10, a reception unit 1010 receives a frame that is transmitted by the transmitter for a broadcasting service. The reception unit 1010 transfers the received frame to a frame analysis unit 1020.

The frame analysis unit 1020 acquires terrestrial broadcasting data or mobile broadcasting data of which the service is desired from the frame received through the reception unit 1010, and outputs the acquired terrestrial broadcasting data or mobile broadcasting data.

The frame analysis unit 1020 decodes the L1 signaling information that constitutes the received frame to acquire desired broadcasting data. Specifically, the frame analysis unit 1020 performs an operation according to a control flow proposed in FIG. 5 or FIG. 7 in order to accurately decode the L1-pre-signaling information that constitutes the L1 signaling information. That is, the frame analysis unit 1020 accumulates the constant L1-pre-signaling information received through a plurality of frames, and if necessary, decodes the frames using the accumulated L1-pre-signaling information. The frame analysis unit 1020 uses recognition information that is included in the L1-pre-signaling information to accumulate the constant L1-pre-signaling information. The frame analysis unit 1020 can recognize whether the L1-pre-signaling information received or to be received has been changed by the recognition information.

Also, the frame analysis unit 1020 acquires the NGH signaling information for the broadcasting data NGH_PLP according to the mobile broadcasting service from the received frame. Also, the frame analysis unit 1020 outputs NGH_PLP that corresponds to a desired mobile broadcasting service from the frame based on the acquired NGH signaling information.

Figure 11:
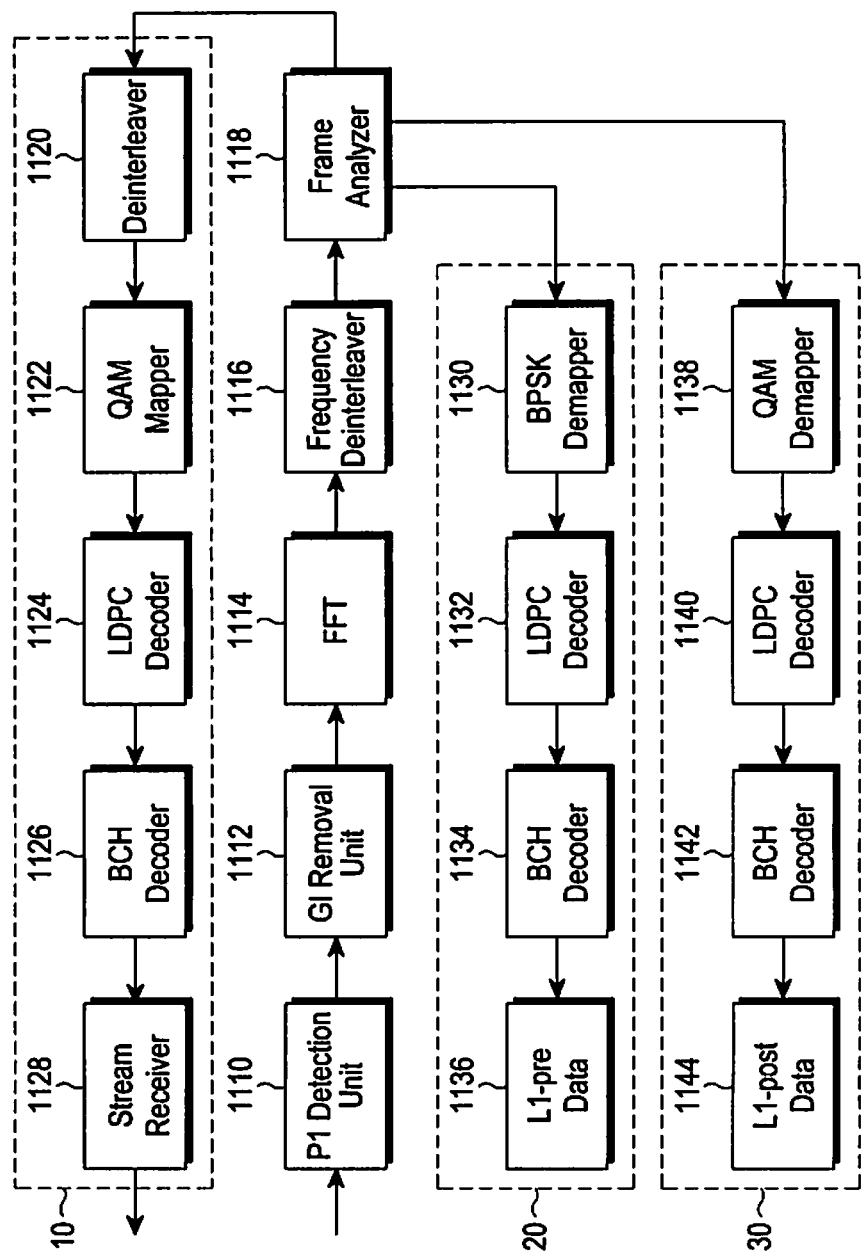
FIG. 11 is a diagram illustrating a detailed configuration of a frame analysis unit in a receiver according to an embodiment of the present invention.

FIG. 11 is a diagram illustrating a detailed configuration of a frame analysis unit in a receiver according to an embodiment of the present invention.

Referring to FIG. 11, a P1 detection unit 1110 detects a P1 symbol from a received signal and performs frame synchronization. The synchronized signal is transferred to a GI removal unit 1112, and a guard interval is removed from the synchronized signal (GI removal), and the signal from which the guard interval has been removed is converted into a frequency domain signal by the FFT 1114.

The signal converted into the frequency domain is deinterleaved by a frequency deinterleaver 1116. The deinterleaved signal is divided into L1-pre-signaling information, L1-post-signaling information, and data for a broadcasting service by a frame analyzer 1118. Also, when the frame includes the NGH signaling information, the NGH signaling information is additionally separated from the received frame by the frame analyzer 1118.

The L1-pre-signaling information detected by the frame analyzer 1118 is analyzed by an L1-pre-signaling information analysis unit 20, and is output as L1-pre data. For this, the L1-pre-signaling information analysis unit accumulates the constant L1-pre-signaling information received through a plurality of frames, and if necessary, performs decoding of the newly received L1-pre-signaling information using the accumulated L1-pre-signaling information. The L1-pre-signaling information analysis unit 20 uses the recognition information included in the L1-pre-signaling information to accumulate the constant L1-pre-signaling information. The L1-pre-signaling information analysis unit 20 can recognize whether the L1-pre-signaling information received or to be received has been changed by the recognition information.

The L1-pre-signaling information analysis unit 20 includes a BPSK demapper 1130, an LDPC decoder 1132, and a BCH decoder 1134.

The L1-pre-signaling information detected by the frame analyzer 1118 is decoded by the BPSK demapper 1130, the LDPC decoder 1132, and the BCH decoder 1134.

The L1-post-signaling information detected by the frame analyzer 1118 is analyzed by the L1-post-signaling information analysis unit 30 and is output as L1-post data. The L1-post-signaling information analysis unit 30 includes a QAM demapper 1138, an LDPC decoder 1140, and a BCH decoder 1142.

The L1-post data detected by the frame analyzer 1118 is decoded by the QAM demapper 1138, the LDPC decoder 1140, and the BCH decoder 1142.

Accordingly, the receiver calculates T2_PLP, NGH signaling information, and MGH_PLP position information using L1-pre data 1136 and L1-post data 1144.

The broadcasting data analysis unit 10 receives a signal in a position of the signal allocated to the receiver among the signals. The broadcasting signal analysis unit 10 includes a deinterleaver 1120, a QAM demapper 1122, an LDPC decoder 1124, and a BCH decoder 1126.

The received signal is time and cell-deinterleaved by the deinterleaver 1120. The deinterleaved data is demodulated by the QAM demapper 1122, and then is channel-decoded through the LDPC decoder 1124 and the BCH decoder 1126. The decoded signal is restored to a broadcasting signal by the stream receiver 1128.

Although not explained in detail, the L1-pre-signaling information in the transmitter and the receiver as seen through FIGS. 9 and 11 includes information that is required in an embodiment of the invention.

Figure 12:
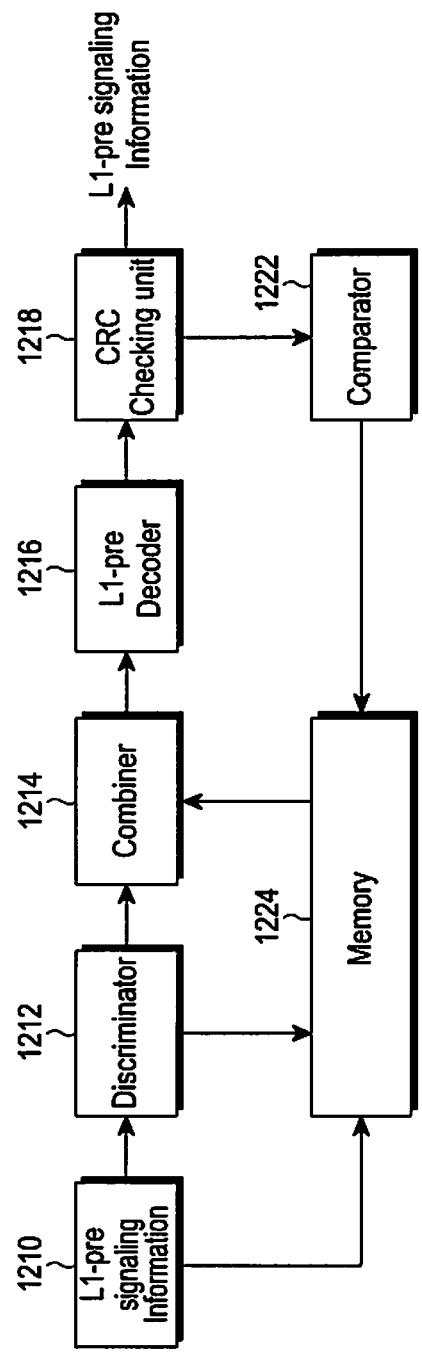
FIG. 12 is a diagram illustrating the configuration for processing L1-pre-signaling information to improve the performance of L1-pre-signaling according to an embodiment of the present invention.

FIG. 12 is a diagram illustrating the configuration for processing L1-pre-signaling information to improve the performance of L1-pre-signaling according to an embodiment of the present invention.

Referring to FIG. 12, a discriminator 1212 that receives L1-pre-signaling information 1210 received by the frame analyzer as an input determines whether the L1-pre-signaling information to be transmitted at the next frame or the L1-pre-signaling information transmitted at the currently received frame has been changed by the received L1-pre information 1210. Here, a method of determining whether the L1-pre information has been changed is as described above. Also, the discriminator 1212 discriminates whether the L1-pre-signaling information stored in a memory 1224 has been reset.

On the other hand, the received L1-pre-signaling information is transferred to the memory 1224, and is accumulatively stored together with the previous L1-pre-signaling information.

The L1-pre-signaling information 1210 received through the discriminator 1212 is provided to a combiner 1214. The combiner 1214 combines the L1-pre-signaling information provided from the discriminator 1212 with the L1-pre-signaling information of the previous frame that is stored in the memory 1224. The combined L1-pre-signaling information is transferred to an L1-pre decoder 1216. The L1-pre decoder 1216 performs DLPC decoding of the combined signal. The decoded signal is provided to a CRC checking unit 1218, and whether an error has occurred is confirmed through the CRC checking. The CRC checking unit 1218 determines whether the L1-pre-signaling information has been received and whether the memory 1224 has been reset in accordance with whether the CRC check has succeeded. That is, the CRC checking unit 1218 receives the L1-pre-signaling information if the CRC check is successfully performed. However, if an error is detected by the CRC check, the decoded L1-pre-signaling information is transferred to a comparator 1222 to determine whether to reset the memory 1224.

While the operation and configuration of the present invention have been shown and described with reference to certain embodiments thereof, it will be understood by those skilled in the art that various changes in form and detail may be made therein without departing from the spirit and scope of the invention as defined by the appended claims.

What is claimed is:

1. A method of transmitting a frame for broadcasting services based on inband signaling in a digital video broadcast transmission apparatus, comprising:

generating the frame comprising a preamble field and a data field including at least data for a terrestrial broadcasting service; and transmitting the generated frame,
wherein the preamble field comprises at least a first signaling part including first signaling information for the terrestrial broadcasting service,
wherein a part of the first signaling part comprises:
  a flag indicating whether the data field further comprises data for a mobile broadcasting service,
  recognition information indicating whether or not there is a change of signaling information in a next frame of the generated frame,
wherein if the flag indicates that the data field includes the data for the mobile broadcasting service, the preamble field further comprises a second signaling part including second signaling information for the mobile broadcasting service.

2. The method of claim 1, wherein the part of the first signaling part comprises L1-pre-signaling information and a remaining part of the first signaling part comprises L1-post-signaling information.

3. The method of claim 1, wherein the recognition information is a sequence comprising a predetermined number of bits, wherein the sequence is different for two consecutive frames, if the change of the signaling information occurs between the two consecutive frames.

4. The method of claim 1, wherein if the flag is "0", the flag indicates that the data field comprises the data for the terrestrial broadcasting service, and
  wherein if the flag is "1", the flag indicates that the data field comprises the data for the terrestrial broadcasting service and the data for the mobile broadcasting service.

5. The method of claim 3, wherein the predetermined number of bits is five bits.

6. A method of receiving a frame for broadcasting services based oar inband signaling in a digital video broadcast reception apparatus, comprising:
  receiving the frame comprising a preamble field and a data field including at least data for a terrestrial broadcasting service;
  determining signaling information from the preamble field of the received frame, and
  obtaining at least one of first data for the terrestrial broadcasting service and second data for a mobile broadcasting service from the data field based on the determined signaling information,
  wherein the preamble field comprises at least a first signaling part including first signaling information for the terrestrial broadcasting service,
  wherein determining signaling information from the preamble field of the received frame comprises:
    obtaining the first signaling information for the terrestrial broadcasting service from the first signaling part of the preamble field,
    indicating whether the data field comprises the second data based on a flag included in the first signaling information,
    if the data field comprises the second data, determining second signaling information for the mobile broadcasting service from a second signaling part of the preamble field,
    determining whether or not there is a change of signaling information in a previous frame of the received frame based on recognition information, wherein the recognition information is included in the first signaling information obtained from the previous frame, and
    if it is determined that the signaling information has not changed, then combining the first signaling information obtained from the received frame with the first signaling information obtained from the previous frame.

7. The method of claim 6, wherein the recognition information is a sequence comprising a predetermined number of bits, wherein the sequence is different for two consecutive frames, if the change of the signaling information occurs between the two consecutive frames.

8. The method of claim 6, wherein the signaling information of which the change is indicated by the recognition information includes L1-pre-signaling information.

9. The method of claim 8, wherein the predetermined number of bits is five bits.

10. A digital video broadcast transmission apparatus transmitting a frame for broadcasting services based on inband signaling, comprising:
  a frame generation unit configured to generate the frame comprising a preamble field and a data field including at least data for a terrestrial broadcasting service; and
  a transmission unit configured to transmit the generated frame,
  wherein the preamble field comprises at least a first signaling part including first signaling information for the terrestrial broadcasting service,
  wherein a part of the first signaling part comprises:
    a flag indicating whether the data field further comprises data for a mobile broadcasting service,
    recognition information indicating whether or not there is a change of signaling information in a next frame of the generated frame, and
  wherein if the flag indicates that the data field includes the data for the mobile broadcasting service, the preamble field further comprises a second signaling part including a second signaling information for the mobile broadcasting service.

11. The apparatus of claim 10, wherein the part of the first signaling part comprises L1-pre-signaling information and a remaining part of the first signaling part comprises L1-post-signaling information.

12. The apparatus of claim 10, wherein the recognition information is a sequence comprising a predetermined number of bits, wherein the sequence is different for two consecutive frames, if the change of the signaling information occurs between the two consecutive frames.

13. The apparatus of claim 10, wherein if the flag is "0", the flag indicates that the data field of the frame comprises the terrestrial broadcasting service data,
  wherein if the flag is "1", the flag indicates that the data field of the frame comprises the terrestrial broadcasting service data and the mobile broadcasting service data.

14. The apparatus of claim 12, wherein the predetermined number of bits is five bits.

15. A digital video broadcast reception apparatus receiving frame for broadcasting services based on inband signaling, comprising:
  a reception unit configured to receive the frame comprising a preamble field and a data field including at least data for a terrestrial broadcasting service;
  a frame analysis unit configured to determine signaling information from the preamble field of the received frame, and obtain at least one of first data for the terrestrial broadcasting service and second data for a mobile broadcasting service from the data field based on the determined signaling information, wherein the preamble field comprises at least a first signaling part including first signaling information for the terrestrial broadcasting service, wherein the frame analysis unit is configured to:
- obtain first signaling information for the terrestrial broadcasting service from the first signaling part of the preamble field,
- indicate whether the data field comprises the second data based on a flag included in the first signaling information,
- if the data field comprises the second data, determine second signaling information for the mobile broadcasting service from a second signaling part of the preamble field,
- determine whether or not there is a change of signaling information in a previous frame of the received frame based on recognition information, wherein the recognition information is included in first signaling information obtained from the previous frame, and
- if it is determined that the signaling information has not changed, then combine the first signaling information obtained from the received frame with first signaling information obtained from the previous frame.

16. The apparatus of claim 15, wherein the recognition information is a sequence comprising a predetermined number of bits, wherein the sequence is different for two consecutive frames, if the change of the signaling information occurs between the two consecutive frames.

17. The apparatus of claim 15, wherein the signaling information of which the change is indicated by the recognition information includes L1-pre signaling information.

18. The apparatus of claim 17, wherein the predetermined number of bits is five bits.

* * * * *